United States Patent
Ma et al.

(10) Patent No.: US 7,983,428 B2
(45) Date of Patent: Jul. 19, 2011

(54) NOISE REDUCTION ON WIRELESS HEADSET INPUT VIA DUAL CHANNEL CALIBRATION WITHIN MOBILE PHONE

(75) Inventors: Changxue Ma, Barrington, IL (US); Chen Liu, Woodridge, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1071 days.

(21) Appl. No.: 11/746,455

(22) Filed: May 9, 2007

(65) Prior Publication Data

US 2008/0280653 A1  Nov. 13, 2008

(51) Int. Cl.
    *H04B 15/00* (2006.01)
(52) U.S. Cl. ..... 381/94.7; 381/94.1; 381/74; 455/569.1; 455/569.2; 455/570; 455/41.2; 379/406.01; 379/406.08
(58) Field of Classification Search ........ 381/94.1–94.3, 381/94.7, 71.6, 390, 381, 74, 317, 389, 86; 455/569.1–569.2, 570, 41.2; 379/406.01, 379/406.08
See application file for complete search history.

(56) References Cited

U.S. PATENT DOCUMENTS

| | | | | |
|---|---|---|---|---|
| 5,125,260 A | * | 6/1992 | Hedeen | 73/1.82 |
| 7,110,800 B2 | * | 9/2006 | Nagayasu et al. | 455/575.2 |
| 7,706,821 B2 | * | 4/2010 | Konchitsky | 455/501 |

| | | | |
|---|---|---|---|
| 2005/0129225 A1 | 6/2005 | Piket et al. | |
| 2005/0129226 A1 | 6/2005 | Piket et al. | |
| 2006/0009154 A1 | 1/2006 | Tung | |

FOREIGN PATENT DOCUMENTS

| | | | |
|---|---|---|---|
| JP | 2006-238148 A | 9/2006 | |
| KR | 10-2006-0089294 A | 8/2006 | |

OTHER PUBLICATIONS

Jung Hun Kim, "PCT International Search Report and Written Opinion," WIPO, ISA/KR, Korean Intellectual Property Office, Daejeon, Republic of Korea, Sep. 2, 2008, 10 pages.

Ahn, Sungjoo and Ko, Hanseok "Background Noise Reduction via Dual-Channel Scheme for Speech Recognition in Vehicular Environment", IEEE Transactions on Consumer Electronics, vol. 51, No. 1, pp. 22-27; Feb. 2005.

Beh, Jounghoon; Baran, Robert H. and Ko, Hanseok "Dual Channel Based Speech Enhancement Using Novelty Filter for Robust Speech Recognition in Automobile Environments" IEEE, pp. 243-244; Dept of Electronics and Computer Engineering, Korea University, Seoul, Korea; 2006.

* cited by examiner

*Primary Examiner* — Devona E Faulk
*Assistant Examiner* — Disler Paul

(57) ABSTRACT

A communication device includes: (1) a wireless adapter at which a wireless headset is communicatively connected to the communication device and at which is received a first acoustic input that includes a speech input and a first ambient noise input; (2) a microphone that receives a second acoustic input, which includes a second ambient noise input; and (3) a dual-channel adaptive noise canceller that utilizes the second ambient noise input to filter the first ambient noise input out of the first acoustic input to generate an acoustic output that primarily comprises the speech input.

16 Claims, 5 Drawing Sheets

NOISE REDUCTION ON WIRELESS HEADSET INPUT VIA DUAL CHANNEL CALIBRATION WITHIN MOBILE PHONE

BACKGROUND

1. Technical Field

The present invention generally relates to communication devices, and in particular to use of wireless headsets with communication devices. Still more particularly, the present invention relates to ambient noise reduction during use of a wireless headset with a communication device.

2. Description of the Related Art

Users of mobile communication devices, such as cell phones, often utilize the communication devices while driving. Increasingly, laws are being imposed to ensure that the devices do not interfere with the safety of the user or others. As a primary example, city and state laws have been passed restricting the use of cell phones (when hand-held) while driving. However, many drivers get around such laws/restrictions by utilizing a secondary device that enables hands-free use of the cell phone.

One such device that is increasingly being utilized is the wireless headset, which enables hand-free access to the cell phone without the headset being tethered to the cell phone. Specifically, Bluetooth® wireless headsets, which operated according to Bluetooth® protocol, have become the primary device for wireless, hands-free, cell phone access. As known in the art, Bluetooth is a communication protocol by which a Bluetooth headset (or other Bluetooth enabled device) is able to connect to and complete near-field communication with a primary device. With cell phone users, Bluetooth headsets provide a convenient way to enable hands-free voice communication over the mobile phone.

Use of Bluetooth (and other) wireless headsets provide added convenience, while ensuring law compliance and greater safety, when driving. However, when a user of a cell phone is driving, there is typically a lot of ambient noise generated by the vehicle and the external environment in which the vehicle travels. For example, the acoustic path is heavily corrupted by car noise that may include vibrations, radio output, and engine fans, or environmental noises, such as outdoor wind, tire-on-road surface noise, and the like. The presence of these noises significantly interferes with detected speech and degrades the quality of speech that is received. An additional amount of ambient noise interference is detected when using a Bluetooth® headset in particular, because the Bluetooth headset does not have a close talking mode (i.e., there is a greater distance between the Bluetooth headset's receiver from the speech source than when talking directly into the built-in microphone of the communication device).

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
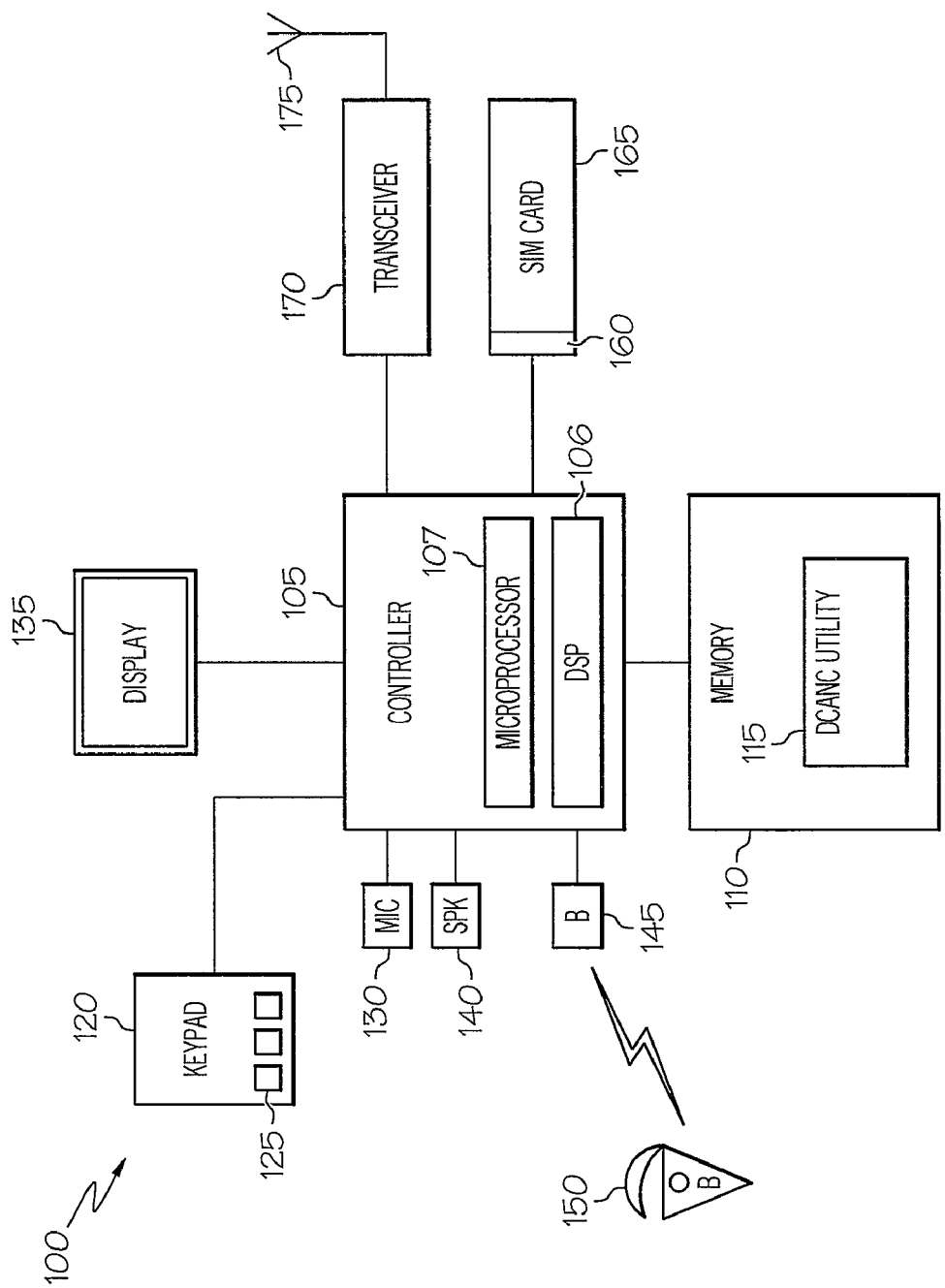
FIG. 1 is a block diagram representation of an example mobile communication device within which features of the invention are advantageously implemented.

The present invention provides a method, system, and communication device for improving the quality of speech input received over a headset that is wirelessly-connected to a communication device. Ambient noise in the environment around the communication device is detected via a secondary input channel and substantially reduced/removed using a dual channel adaptive noise cancellation system.

In the following detailed description of illustrative embodiments, specific illustrative embodiments by which the invention is practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and equivalents thereof.

The figures described below are provided as examples within the illustrative embodiment(s), and are not to be construed as providing any architectural, structural or functional limitation on the present invention. The figures and descriptions accompanying them are to be given their broadest reading including any possible equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the terms noise, "ambient noise", "enviromnental noise", "surrounding noise", and the like are intended to refer to any detectable acoustic signal within the environment in which the communication device is being utilized/operated that is not associated with a human utterance or voice or speech of the user of the wireless headset connected to the device. The source of such noise is not relevant to the implementation of the described embodiments.

With reference now to the figures, FIG. 1 is a block diagram representation of an example communication device and associated wireless headset, configured with the functional capabilities required to enable automatic adaptive filtering of surrounding noise from received acoustic input that includes speech utterances captured at the wireless headset, in accordance with the following described embodiments of the invention. According to the illustrative embodiment, communication device 100 is a cellular/mobile phone. However, it is understood that the functions of the invention are applicable to other types of communication devices and that the illustration of communication device 100 and description thereof as a mobile phone is provided solely for illustration. For example, communication device may be a personal digital assistant (PDA), a Blackberry™, an Ipod®, or other similar potable device with the functionality to support speech capture via a wirelessly-connected headset. Similarly, while described as a portable or mobile device, the communication device may also be a non-portable (e.g., desktop phone or vehicle-integrated car phone) with similar voice capture capabilities via a remote wirelessly connected headset.

Each embodiment of communication device 100 is thus equipped with some mechanism to enable voice capture for the communication device 100 via a wirelessly-connected headset. Also, each communication device includes a local/internal microphone utilized for similar voice capture during standard operation and ambient noise capture during dual channel operation, as described herein. The illustrated and described embodiments are described from the perspective of a Bluetooth headset, which is a wireless acoustic (speech) capture (and output) device that provides wireless communication with communication device 100 using Bluetooth® near field communication protocol. However, the features of the described embodiment are equally applicable to other types of wirelessly-connected acoustic (speech) capture devices that may communicatively connect with communication device 100 using any one of a number of available or yet to be developed wireless protocols.

Returning now to FIG. 1, communication device 100 comprises central controller 105 which is connected to memory 110 and which controls the communications operations of radio device 100. Included among these operations are the generation, transmission, reception, and decoding of speech and data signals. As illustrated, controller 105 comprises digital signal processor (DSP) 106, which handles the receipt and transmission of analog and/or digital signals. Controller 105 also comprises programmable microprocessor 107, which controls the overall functions of communication device 100. While shown as separate components, it is understood that both functionality provided by both components may be integrated into a single component. It is further appreciated that the functions of both components operate in concert, where necessary, to provide the speech communication (and dual-channel adaptive noise cancellation) features of communication device 100. In one embodiment, microprocessor 107 is a conventional multi-purpose microprocessor, such as an MCORE family processor, and DSP 106 is a 56600 Series DSP, each device being available from Motorola, Inc.

Communication device 100 also comprises input devices, of which keypad 120, and microphone (mic) 130 are illustrated connected to controller 105. Microphone 130 represents any type of acoustic capture/receiving device that detects/captures acoustic (or acoustic) sounds/signals that may be converted into a digital representation and manipulated within communication device 100. Additionally, communication device 100 comprises output devices, including speaker 130 and optional display 135, both also connected to controller 105.

According to the illustrative embodiment, communication device 100 includes Bluetooth adapter 145, which is an internal (transceiver) mechanism that enables communication device 100 to communicatively connect to Bluetooth headset 150 and receive acoustic (or acoustic) signals detected by the microphone of Bluetooth headset 150 and transmit acoustic signals to the speaker of Bluetooth headset 150. With the inclusion of Bluetooth adapter 145 within communication device 100, a user of communication device 100 is able to utilize Bluetooth headset 150, paired to Bluetooth adapter 145, to exchange (i.e., receive and send) speech communication with communication device 100.

The above described input and output devices are coupled to controller 105 and allow for user interfacing with communication device 100. For example, microphone 130 is provided for converting speech from the user into electrical signals, while internal speaker 140 provides acoustic signals (output) to the user. These functions may be further enabled by a voice coder/decoder (vocoder) circuit (not shown) that interconnects microphone 130 and speaker 140 to controller 105 and provide analog-to-digital and or digital-to-analog signal conversion. According to the described embodiments, microphone 130 may also be utilized to detect surrounding/background/environmental sounds (generally referred to herein as ambient noise) around communication device 100 while acoustic input (including speech input) is being provided via Bluetooth headset 150 communicatively-connected to communication device 100. The detection of surrounding/background/environmental sounds and applicability thereof to the invention is described in greater detail below.

In addition to the above components, communication device 100 further includes transceiver 170, which is connected to antenna 175. Transceiver 170, in combination with antenna 175, enable communication device 100 to transmit and receive wireless radio frequency (RF) signals from and to communication device 100. Transceiver 170 includes an RF modulator/demodulator circuit (not shown) that generates and deciphers/converts the RF signals. When communication device 100 is a mobile phone, some of the received RF signals may be converted into speech signals which are outputted via speaker 140 (or Bluetooth headset 150, if connected) for the user to listen.

Communication device 100 may be a GSM phone and include a Subscriber Identity Module (SIM) card adapter 160. SIM card adapter 160 couples SIM card 165 to controller 105. SIM card 165 may be utilized as a storage device for storing specific (vehicular) noise parameters/data previously detected during use by Bluetooth headset 150 by the particular user to whom SIM card 165 is associated.

Those of ordinary skill in the art will appreciate that the hardware depicted in FIG. 1 may vary depending on implementation. Other internal hardware or peripheral devices may be used in addition to or in place of the hardware depicted in FIG. 1. Thus, the depicted example is meant solely for illustration and is not meant to imply architectural limitations with respect to the present invention.

In addition to the above hardware components, several functions of radio device 100 and specific features of the invention may be provided as programmable code or logic, which is stored within memory 110 and executed by microprocessor 107 (or DSP 106) within controller 105. The combination of code and/or logic that collectively provides the functional features of the described embodiments is referred to herein as Dual-Channel Adaptive Noise Cancellation (DCANC) utility 115. The functionality of DCANC utility 115 will be described in greater detail below with reference to FIGS. 4 and 5. However, when executed by microprocessor 107, key functions provided by the DCANC utility 150 include, but are not limited to: (1) receiving an activation signal indicating connection of Bluetooth headset 150 to communication device 100 (via adapter 145); (2) receiving an acoustic input that includes speech signals (human utterances) transmitted from the Bluetooth headset 150 to communication device 100; (3) receiving an input of ambient noise detected around the communication device 100 by microphone 130; (4) calibrating the ambient noise received at microphone 130; (5) filtering out the ambient noise from the detected speech utterances using the dual acoustic inputs from separate receiving devices (Bluetooth headset 150 and microphone 130); (6) forwarding only the resulting/filtered speech signals (the ambient noise is cancelled), for further communication processing.

Figure 2:
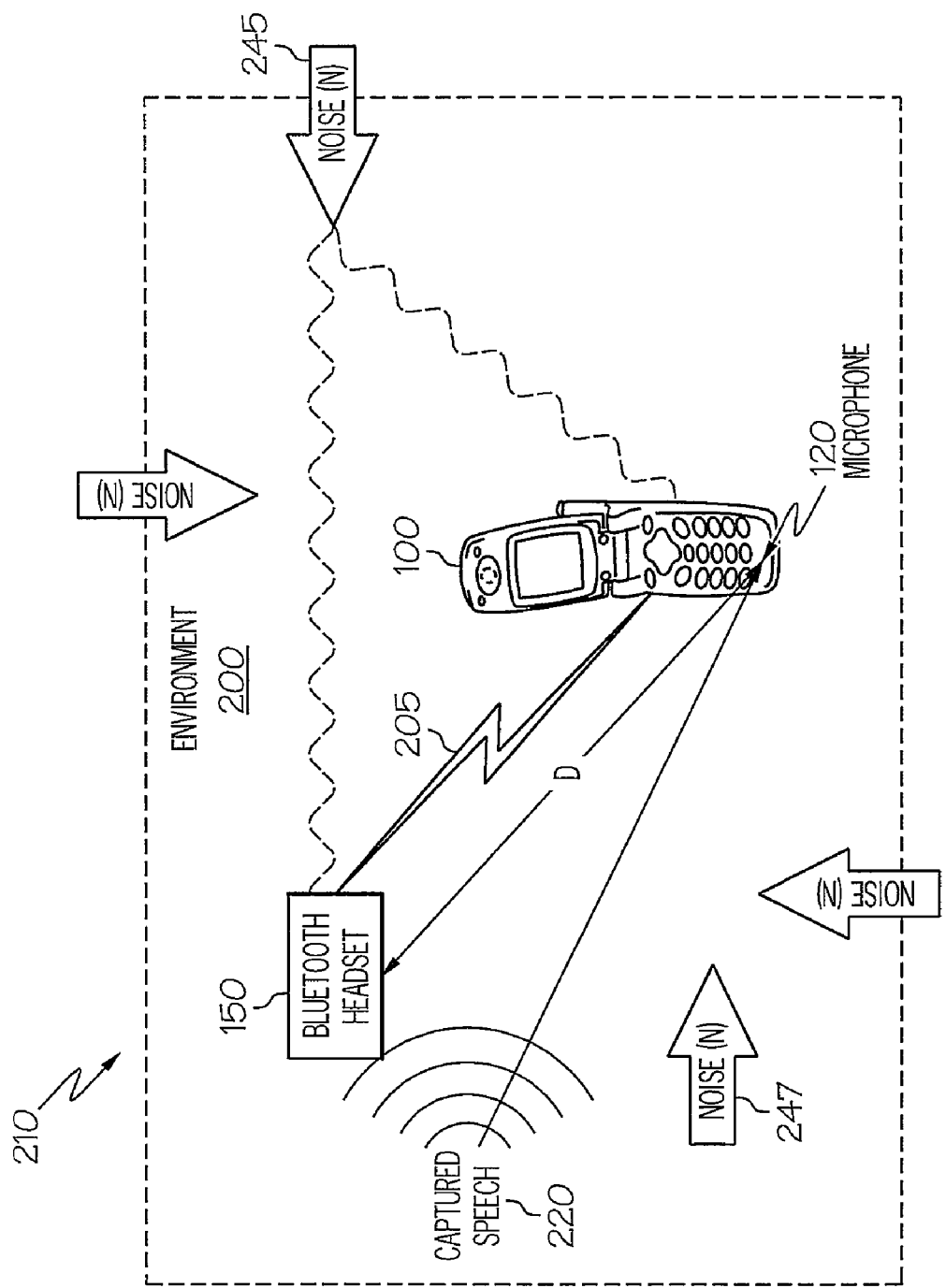
FIG. 2 provides a system diagram depicting a noise-infiltrated environment of a mobile communication device, according to one embodiment of the invention.

The illustrated and described embodiments of the present invention provides a method and mechanism by which a Bluetooth-enabled mobile phone (communication device 100) is able to (a) sense the "context" of Bluetooth headset use, and (b) combine the Bluetooth acoustic path and the microphone acoustic path within the mobile phone to form a dual-channel noise cancellation system to improve the output speech. FIG. 2 illustrates in greater detail a generalized environment 200 within which the embodiments may be implemented. As depicted, Bluetooth headset 150 is communicatively coupled to communication device 100 within environment 200. Bluetooth headset 150 forwards received acoustic input, which includes captured speech (or speech utterances) 220, via wireless communication path 205 to Bluetooth adapter (not shown) of communication device 100. Communication device 100 includes microphone 120, which is located at a particular distance, D, from Bluetooth headset 150. The relevance of the distance of separation between the two acoustic receiving devices (150, 130) is explained below.

As shown, environment 200 also includes several noise sources, of which external noise sources 245 and internal noise sources 247 are illustrated. These noise sources represent any audible sound that may be captured (as shown by acoustic signal lines from noise source 245) by either of the acoustic receiving devices (Bluetooth headset 150, microphone 130) within environment 200. For example, when environment 200 is the inside of a moving vehicle (as illustrated by FIG. 3, described below), these noises may be air flow against the vehicle, tire noise, road noise, rattling of mechanical parts or the body of the vehicle, radio output, noise from other vehicles, and the like.

Figure 3:
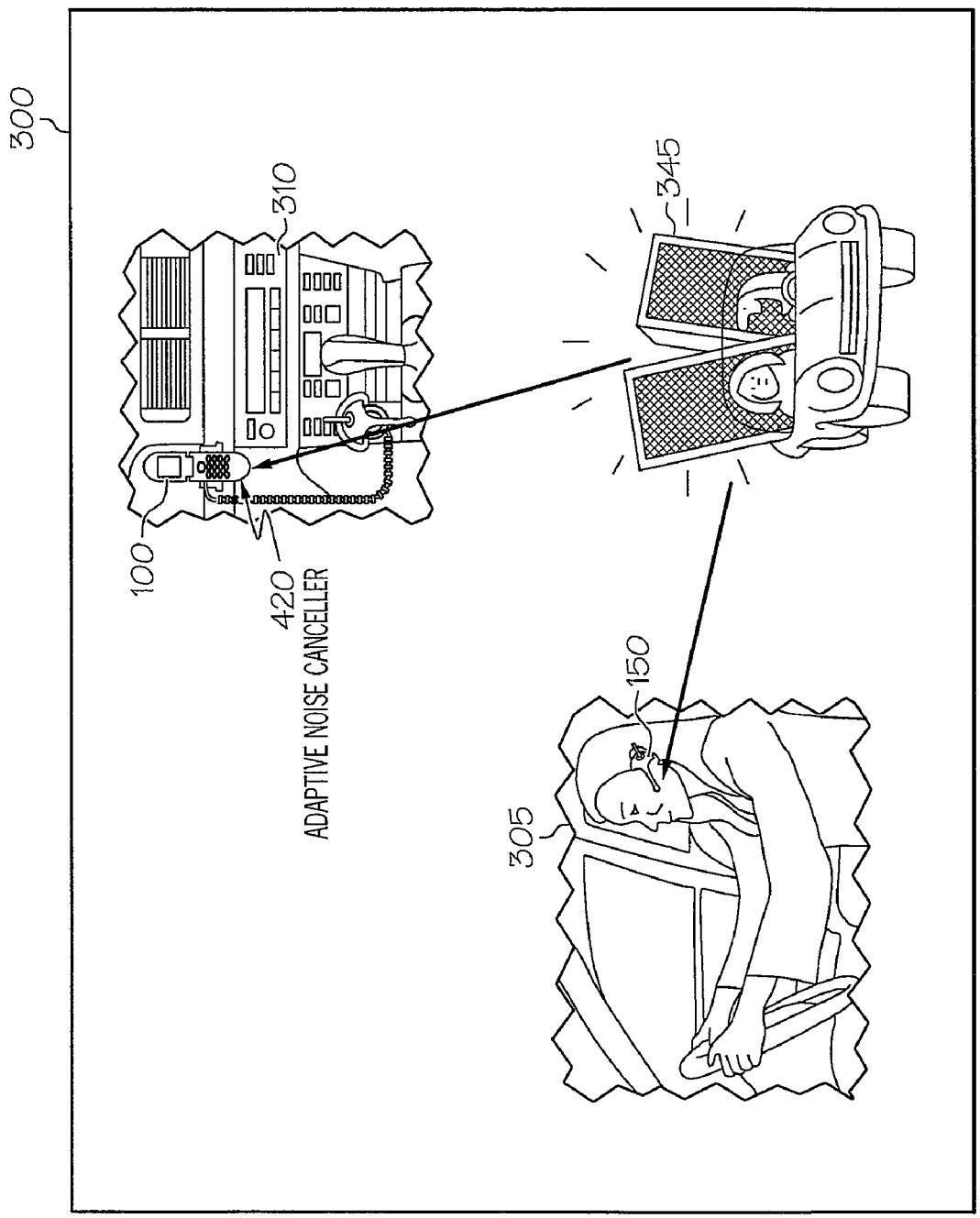
FIG. 3 is a vehicular example of the noise-infiltrated environment of FIG. 2 according to one exemplary embodiment of the present invention.

FIG. 3 illustrates a more specific environment, namely in-car (or in-vehicle) environment 300, within which the features of the described embodiments may advantageously be implemented. As with FIG. 2, in-car environment includes a mobile phone as communication device 100 (within device view 310) and Bluetooth headset 150 being utilized by the driver of the vehicle (within user view 305). External noise source 220 generates noise that is picked up by both the microphone of communication device 100 and the receiver of Bluetooth headset 150. As shown by device view 310, the communication device includes an adaptive noise canceller, which is software and/or firmware and/or hardware logic, or a combination thereof, that enable the ambient noise-removal features of the described embodiments.

The following sequence of activity represents one scenario with the above illustrations (FIGS. 2 and 3). While driving, the driver puts on Bluetooth headset 150 and pairs (communicatively connects) the headset 150 with the cellular phone (100). The driver places the phone (100) at a proper distance from the headset, such as in the pocket of the driver's pants or, as shown, on a base located on the car's dashboard. As explained in more detail below, a warning signal may be generated to prompt the driver to increase the distance (D) between the Bluetooth headset 150 and the cellular phone (100). This signal is generated when the two devices (150, 100) are closer to each other than a pre-determined threshold distance recommended for proper implementation of the dual-channel acoustic capture and adaptive noise cancellation processes.

Figure 4:
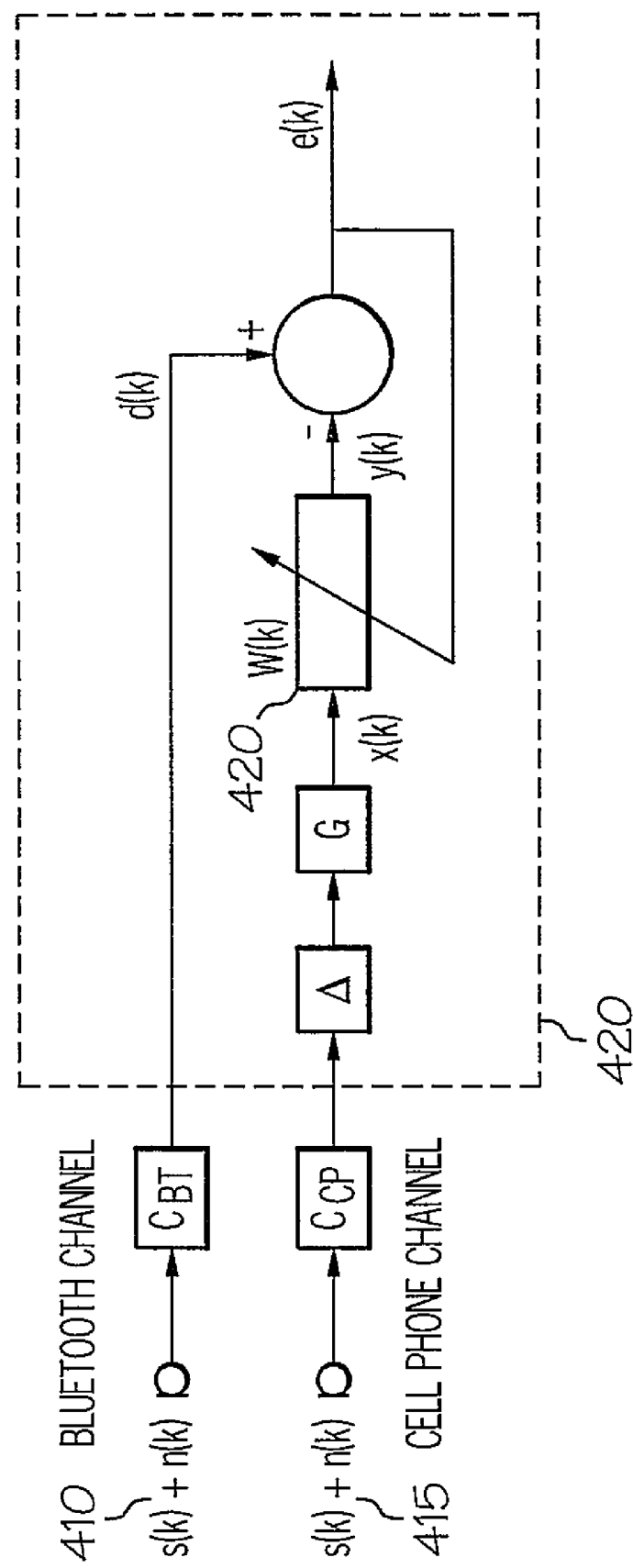
FIG. 4 illustrates logic components of a dual-channel adaptive noise cancelling system, according to one embodiment of the invention.

Referring now to FIG. 4, there is illustrated an example of the logic components comprising an adaptive noise canceller (i.e., a dual-channel adaptive nose cancellation system) 420, according to one embodiment of the invention. FIG. 4 is described with reference to FIG. 2 and/or FIG. 3, where appropriate. As shown by FIG. 4, inputs to adaptive noise canceller 420 consists of a main or primary channel 410 (Bluetooth channel/input) and a reference or secondary channel 415 (i.e., the microphone channel/input). Specifically the main channel 410 receives both speech signal (captured speech/human utterances 220) and the ambient noise (noise 245, 247) while the reference channel 415 mainly receives the ambient noise (noise 245, 247).

In FIG. 4, $C_{BT}$ represents the Bluetooth channel characteristics, including characteristics of the receiver (in Bluetooth headset), the headset response, the wireless transmission, and the corresponding acoustic path in the phone. $C_{CP}$ represents the regular cell phone input channel characteristics, including characteristics of the microphone 130 and acoustic path. It is understood that the system provided by FIG. 4 is a logical representation of functional components that comprise adaptive noise canceller 420, which receives two signal inputs and provides a single signal output. As mentioned above, functional components within adaptive noise canceller 420 may be implemented as software/firmware logic executing on microprocessor 106 (or DSP 107) of FIG. 1 under the control of DCANC utility 115 (FIG. 1).

In one embodiment, the cellular phone (100), specifically microphone 130, is located at or above a preset threshold distance away from the Bluetooth headset 150 to prevent or minimize leakage of the speech signal into the reference channel 415. The adaptive noise canceller 420 then performs adaptive noise cancellation by utilizing a calibrated version of the signal received on the reference channel 415 to cancel the noise component in the main channel 410.

As can be seen from FIG. 2, the noise detected by Bluetooth headset 150 and microphone 130 travels along different paths from the noise source (245) before reaching the inputs of adaptive noise canceller 420 within communication device 100. Thus, phase, amplitude, timing and other differences exist between the received signals on both channels (410, 415).

In one embodiment, the reference channel 415 is calibrated (via Automatic Channel Calibration (ACC)) in order to guarantee the quality of the noise cancellation performance. The frequency responses of the two acoustic channels (410, 415) are matched in the ACC procedure, which includes two processes: (1) normalization (or equalization) and (2) temporal (or phase) alignment. The normalization process mainly serves to equalize the frequency responses between the two channels (410, 415) so as to minimize the mismatch caused by microphone differences, the Bluetooth channel, as well as other kinds of channel differences. The normalization process also compensates for the difference in amplification, i.e., automatic gain control (AGC), between the two channels (410, 415). This alignment of the two signals received from the two channels (410, 415) is performed to remove the temporal or phase difference caused by the difference in delay between the acoustic signals traveling in the two channels (410, 415). In one embodiment, the channel calibration is performed automatically, once for each session, when the Bluetooth headset 150 and the cellular phone (100) are in a relatively fixed position, such as when the user is sitting in the car, with the headset 150 connected at the proper distance from the cellular phone (100).

In FIG. 4, the primary purpose of the adaptive noise canceller 420 is to cancel the noise n(k) in the main channel 410 using a filtered version of the noise n'k) in the reference channel 415 by means of the adaptive filter W(k) 420. According to the illustration, the speech signal s(k) enters primarily through the main channel, due to the distance (D) of the captured speech from the microphone (FIG. 2). However, some leakage of the speech signal, denoted by s'(k), may occur into the reference channel. The amount of this leakage is minimized by ensuring that the distance, D, is above the pre-established minimum distance threshold ($D_{th}$). The determination of the value of D is completed using any one of multiple available methods for determining a distance between a transmitter and receiver of a wireless signal. The secondary purpose of the adaptive filter W(k) 420 is to provide channel calibration, as mentioned above.

Operation of the adaptive noise canceller 420 is now described. The criterion for adapting the filter W(k) 420 is to iteratively minimize the cancellation output $E\{e^2(k)\}$ where:

$$e(k)=d(k)-y(k)$$

Next, suppose that the filter has L parameters, whereby:

$$W(k)=\{w_i(k)\} 0 \leq i \leq L$$

Then, the popular gradient-based solution is:

$$W(k+1) = W(k) - \mu(k)\frac{\partial J(k)}{\partial W(k)}$$

where J(k) is the cost function and µ(k) is a step size parameter. The algorithms utilized within the embodiments of the invention may be one of several algorithms that may implement the above computation within a processing device. In a least-mean-square (LMS) algorithm, for example, the cost function takes a simple form, such as:

$$J_{LMS}(k) = \frac{1}{2}e^2(k)$$

The filter parameters can be obtained in the following equation:

$$W(k+1)=W(k)-\mu(k)e(k)X(k)$$

where X(k) is the input signal to the filter W(k), as shown in FIG. 4.

With the above computations, the converging speed of the adaptation is of relevance during implementation. According to one embodiment, the adaptation process is activated before the user of the Bluetooth headset begins talking. Specifically, the process may be initiated as soon as the headset is communicatively connected to the cellular phone and/or at the time when the positions of the Bluetooth headset 150 and the cellular phone (100) are fixed at the threshold distance apart from each other. Implementation of an initial period of adaptation, prior to speech capture, may also include estimation of the gain parameter, G, and delay parameter, Δ. Once the convergence is reached, the parameters of filter W(k) 420 can be used as a starting state for later adaptation when actual speech begins. In one embodiment, a voice-activity detector is employed to ensure that a non-speech period is present for better beginning adaptation.

Other embodiments of the invention may be completed without a requirement for a beginning adaptation period. Thus, in one implementation, the adaptive filter learns to adapt for both equalization and cancellation at the same time. However, with such an implementation, the adaptation may take a much longer time to converge. Given that most speech communication lasts for a period of time longer than would be required to complete the calibration and subsequent filtering, a gradual improvement of the speech signal (in a noisy environment) may be provided when the calibration is not completed prior to the initiation of speech communication via the Bluetooth headset.

The distance between the two acoustic receiving devices (Bluetooth receiver and microphone 130) and the time before speech is captured at the headset determines the length of time required to adaptively calibrate the reference channel 415. The invention is thus applicable to a dynamically changing environment in which the distance and orientation of both microphones are changing due to movement of the headset 150 or the cellular phone (100). This feature of the invention further enables the deployment of the calibration process in a context-adaptive manner that combines the current parameters and context of the built-in and wireless acoustic receivers.

In one embodiment, a historical reference is maintained for the particular wireless headset. Whenever that wireless headset is detected as being communicatively connected to the communication device, the stored parameters for that device are retrieved, and calibration of the reference channel is initiated from that reference position. Detection of the specific wireless headset is based on a unique identifying signal provided by each such headset that enables that specific headset to pair with the user's mobile device. Since the majority of the operating parameters of both the Bluetooth headset and the reference channel (microphone 130) remain unchanged from one implementation to the other, a complete recalibration of the parameters may not be required each time the Bluetooth headset is paired to the communication device 100. However, a recalculation of the stored historical parameters is completed, following the initial connections (perhaps after speech has commenced) to account for any differences between the previous historical parameters and current operating conditions, and new parameter values are generated and stored.

Figure 5:
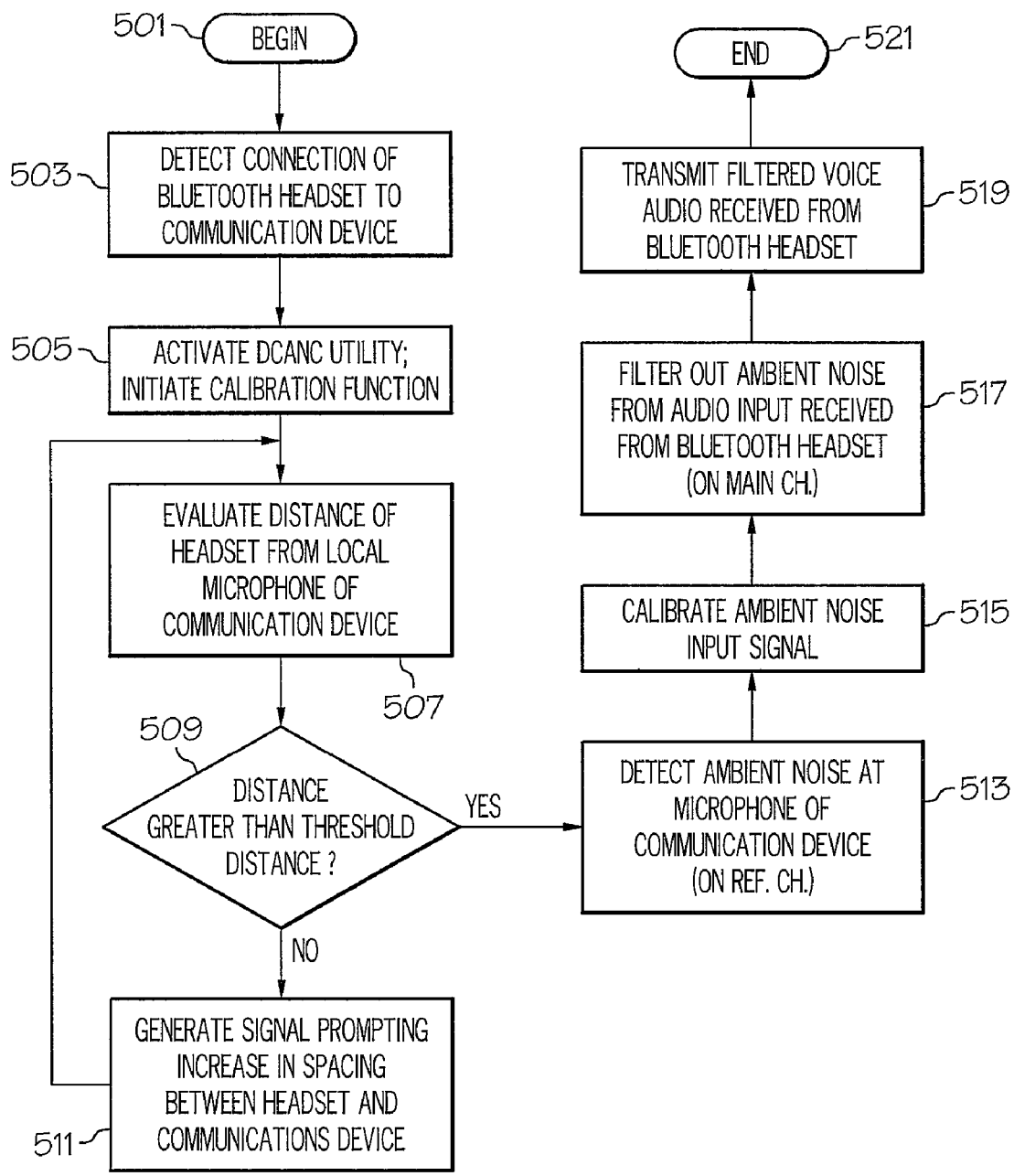
FIG. 5 is a flow chart illustrating the process by which speech input received at a remote Bluetooth headset is filtered to remove ambient noise using the dual channel adaptive noise cancelling system of FIG. 4, according to one embodiment of the invention.

FIG. 5 is a flow chart illustrating one method by which the above processes are completed, according to an embodiment of the invention. FIG. 5 is described with reference to components illustrated within FIG. 1 through FIG. 4, where appropriate. Although the method illustrated in FIG. 5 may be described with reference to components shown in FIGS. 1-4, it should be understood that this is merely for convenience and alternative components and/or configurations thereof of the systems, devices, and logic can be employed when implementing the method. Key portions of the method may be completed by DCANC utility 115 (FIG. 1) executing within microprocessor 106 (FIG. 1) and controlling specific operations of adaptive noise canceller (420) within DSP 106. For simplicity, the method is generally described from the perspective of the communication device, which is understood to include DCANC utility 115 and associated adaptive noise canceller functionality executing within controller 105 (FIG. 1).

The process of FIG. 5 begins at block 501 and proceeds to block 503, which illustrates the communication device 100 detecting the connection of Bluetooth headset 150 to the communication device 100. As understood by those skilled in the art, a wireless connection of Bluetooth headset 150 involves certain actions by the user and typically requires a registration process by which Bluetooth headset 150 registers or re-activates a connection with the communication device 100. This registration process is required before Bluetooth headset 150 can be utilized by the user for communicating with communication device 100, and the detection of the registration process is thus utilized as a trigger for initiating the adaptive noise cancellation processes of the described embodiments.

Once connection of the headset 150 is detected, the communication device 100 activates DCANC utility 115 and initiates adaptive calibration of the reference channel, as shown at block 505. Concurrently, the communication device 100 evaluates the spatial distance between the Bluetooth headset 150 and the microphone 130 at which input for the reference channel is detected, as indicated at block 507. Any method of determining the distance may be utilized by the device. At block 509, the utility checks whether the distance, D, is greater than the minimum threshold distance required for reliable calibration of the reference channel. This minimum threshold distance enables the dual-channel adaptive noise canceller to provide a measurable improvement in a quality of a speech signal within the acoustic output relative to the speech signal within the first acoustic input due to filtering out of ambient noise from the first acoustic input. Assuming the distance is not great enough, the communication device 100 generates a signal that is outputted to the user, prompting the user to increase the spacing between the headset 150 and the communication device 100. The signal may be provided in one of a number of ways, including audibly via Bluetooth headset 150 or speaker 140, visibly via display 135, or in some other manner. According to one implementation, the calibration of the reference channel and subsequent filtering out of noise from the voice/main channel is completed only when the distance, D, is greater than the threshold. The communication device 100 continues to periodically check the distance, D, and enables the calibration if the distance becomes greater than the threshold. In one embodiment, the check of the distance continues after the initial calibration so that subsequent changes in the distance between the devices is periodically re-evaluated to determine whether to continue using the noise cancellation features of the adaptive noise canceller 420.

Returning to decision block 509, when the distance is greater than the minimum threshold distance, the communication device 100 receives the ambient noise on the reference channel, detected by microphone 130, as shown at block 513. The signal input (ambient noise) at the reference channel is then calibrated, as shown at block 515. Notably, in one embodiment, calibration of the received acoustic signal on the reference channel 415 continues until the Bluetooth headset 150 is disconnected from the communication device 100 or the distance between the headset 150 and the communication device 100 is reduced to less than the threshold distance. Also, in one embodiment, the calibrated reference channel parameters are stored for subsequent/future use. The calibrated ambient noise (input) is filtered out from the acoustic input received from the Bluetooth headset 150 on the main channel, as shown at block 517. In one embodiment, this filtering involves inverting the calibrated ambient noise input and then adding the inverted input signal to the first ambient noise input, which is received within the acoustic input from the wireless headset. Then, the resulting acoustic output signal generated by the filter is transmitted via standard speech transmission on the output channel, as shown at block 519. The process then ends at block 519.

In some implementations of the above method, certain steps of the method are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While the invention has been described with reference to exemplary embodiments, it will be understood by those skilled in the art that various changes may be made and equivalents may be substituted for elements thereof without departing from the scope of the invention. For example, while the present invention has been described with regard to cellular phones and Bluetooth headsets, it should be understood that at least some aspects of the present invention may be suited for use with any communication device and associated wireless acoustic receiving device is not limited to those devices described herein. In addition, many modifications may be made to adapt a particular system, device or component thereof to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A communication device comprising:
   a wireless adapter at which a wireless headset communicatively connects to the communication device and at which is received a first acoustic input that includes a speech input and a first ambient noise input;
   a microphone that receives a second acoustic input, which includes a second ambient noise input;
   a dual-channel adaptive noise canceller that utilizes the second ambient noise input to filter the first ambient noise input out of the first acoustic input to generate an acoustic output that primarily comprises the speech input;
   logic for evaluating when a distance between the wireless headset and the communication device is less than a preset threshold distance, which distance enables the dual-channel adaptive noise canceller to provide a measurable improvement in a quality of a speech signal within the acoustic output relative to the speech signal within the first acoustic input due to filtering out of ambient noise from the first acoustic input; and
   logic for activating the dual-channel adaptive noise canceller only when the distance is not less than the preset threshold distance;
   wherein no ambient noise cancellation is provided via the dual-channel adaptive noise canceller when the wireless headset is less than the preset threshold distance from the communications device.

2. The communication device of claim 1 further comprising:
   logic that detects pairing of the wireless headset with the wireless adapter of the communication device; and
   logic that responds to a detection of the pairing of the wireless headset to the wireless adapter by (a) automatically activating the dual-channel adaptive noise canceller, (b) forwarding detected first acoustic input from the wireless headset to a first input channel of the dual channel adaptive noise canceller and (c) forwarding detected second acoustic input from the microphone to a second input channel of the dual-channel adaptive noise canceller.

3. The communication device of claim 2 wherein the dual-channel adaptive noise canceller comprises:
logic for calibrating the second ambient noise input to balance an amplitude and phase of said second ambient noise input with those of the first ambient noise input, in response to the forwarding of the detected second acoustic input on the second input channel, wherein said calibrating yields a calibrated second ambient noise input; and
logic for filtering the first ambient noise input from the first acoustic input utilizing the calibrated second ambient noise input.

4. The communication device of claim 2 further comprising logic for initiating calibration of the second ambient noise input prior to enabling speech communication via the wireless headset.

5. The communication device of claim 1 further comprising:
logic for generating a signal indicating that the wireless headset is too close to the communication device to perform adaptive noise cancellation using the dual-channel adaptive noise canceller;
logic for monitoring for a change in a current distance between the wireless headset and the communication device; and
logic for dynamically turning the adaptive noise canceller off when the current distance falls below the preset threshold distance.

6. The communication device of claim 5 further comprising:
logic for storing measured parameters of the first input channel and the second input channel during a first connection of the wireless headset to the communication device;
logic for initially defaulting to the stored measured parameters when the wireless headset is subsequently re-connected to the communication device during a later connection;
logic for re-evaluating the measured parameters during each subsequent connection; and
logic for storing an updated value of the measured parameters following said re-evaluating of the measured parameters.

7. The communication device of claim 1 wherein the wireless headset is a Bluetooth headset that is communicatively-connected to the wireless device via Bluetooth protocol, wherein a higher quality speech input is provided as the acoustic output when utilizing the Bluetooth headset to communicate speech input that is filtered via the dual-channel adaptive noise canceller of the communication device.

8. In a communication device having a microphone and mechanisms for communicatively coupling to a wireless headset, a method comprising:
receiving from the wireless headset a first acoustic input that includes a speech input and a first ambient noise input;
receiving from the microphone a second acoustic input, which includes a second ambient noise input;
activating a dual-channel adaptive noise canceller only when a distance between the wireless headset and the communication device is not less than a preset threshold distance, which distance enables the dual-channel adaptive noise canceller to provide a measurable improvement in a quality of a speech signal within the acoustic output relative to the speech signal within the first acoustic input due to filtering out of ambient noise from the first acoustic input;
filtering the first ambient noise input out of the first acoustic input to generate an acoustic output that comprises the speech input, wherein said filtering utilizes the second ambient noise input within a dual channel adaptive noise canceller;
generating a signal indicating that the wireless headset is too close to the communication device to perform adaptive noise cancellation via the dual-channel adaptive noise canceller;
monitoring for a change in a current distance between the wireless headset and the communication device; and
dynamically turning the adaptive noise canceller off when the current distance falls below the preset threshold distance.

9. The method of claim 8 further comprising:
detecting a pairing of the wireless headset with the communication device; and
responding to a detection of the pairing of the wireless headset to the communication device by (a) automatically activating the dual-channel adaptive noise canceller, (b) forwarding detected first acoustic input from the wireless headset to a first input channel of the dual channel adaptive noise canceller and (c) forwarding detected second acoustic input from the microphone to a second input channel of the dual-channel adaptive noise canceller.

10. The method of claim 9 further comprising:
calibrating the second ambient noise input to balance an amplitude and phase of said second ambient noise input with those of the first ambient noise input, wherein said calibrating yields a calibrated second ambient noise input; and
filtering the first ambient noise input from the first acoustic input utilizing the calibrated second ambient noise input.

11. The method of claim 9 further comprising initiating calibration of the second input channel prior to enabling speech communication via the wireless headset.

12. The method of claim 8 further comprising:
storing measured parameters of the first input channel and the second input channel during a first connection of the wireless headset to the communication device;
defaulting to the stored measured parameters when the wireless headset is initially re-connected to the communication device during a later connection;
re-evaluating the measured parameters during each subsequent connection; and
storing an updated value of the measured parameters following said re-evaluating of the measured parameters.

13. The method of claim 8 wherein the wireless headset is a Bluetooth headset that is communicatively-connected to the wireless device via Bluetooth protocol, wherein a higher quality speech input is provided as the acoustic output when utilizing the Bluetooth headset to communicate speech input that is filtered via the dual-channel adaptive noise canceller of the communication device.

14. A system comprising:
a processor and a memory;
a microphone;
a mechanism for communicatively coupling to a wireless headset; and a dual-channel adaptive noise cancellation utility having logic that when executed by the processor provides the functions of:
  detecting a pairing of the wireless headset with the mechanism for communicatively coupling the wireless headset;
  receiving from the wireless headset a first acoustic input that includes a speech input and a first ambient noise input;
  receiving from the microphone a second acoustic input, which includes a second ambient noise input;
  evaluating when a distance between the wireless headset and the mechanism is less than a preset threshold distance;
  activating the adaptive noise canceller only when the distance is not less than the preset threshold distance;
  wherein no ambient noise cancellation is provided via the dual-channel adaptive noise canceller when the wireless headset is less than the preset threshold distance from the mechanism;
  calibrating the second ambient noise input to balance an amplitude and phase of said second ambient noise input with those of the first ambient noise input, wherein said calibrating yields a calibrated second ambient noise input; and
  filtering the first ambient noise input from the first acoustic input to generate an acoustic output that comprises the speech input, wherein said filtering utilizes the calibrated second ambient noise input within a dual-channel adaptive noise canceller.

15. The system of claim 14 said utility further comprising:
logic for generating a signal indicating that the wireless headset is too close to the communication device to perform adaptive noise cancellation using the dual channel adaptive noise canceller;
logic for monitoring for a change in a current distance between the wireless headset and the mechanism; and
logic for dynamically turning the adaptive noise canceller off when the current distance falls below the preset threshold distance.

16. The system of claim 15 said utility further comprising:
logic for storing measured parameters of the first input channel and the second input channel during a first connection of the wireless headset to the mechanism;
logic for defaulting an initial calibration to the stored measured parameters when the wireless headset is initially re-connected to the mechanism during a later connection;
logic for re-evaluating the measured parameters during each subsequent connection; and
logic for storing an updated value of the measured parameters following said re-evaluating of the measured parameters.

* * * * *